(12) United States Patent
Grossner et al.

(10) Patent No.: US 8,214,451 B2
(45) Date of Patent: Jul. 3, 2012

(54) NETWORK SERVICE VERSION MANAGEMENT

(75) Inventors: Clifford Grossner, Ottawa (CA); Laura Mihaela Serghi, Ottawa (CA); Piragash Velummylum, Seattle, WA (US)

(73) Assignee: Alcatel Lucent, Paris (FR)

( * ) Notice: Subject to any disclaimer, the term of this patent is extended or adjusted under 35 U.S.C. 154(b) by 328 days.

(21) Appl. No.: 11/624,718

(22) Filed: Jan. 19, 2007

(65) Prior Publication Data
US 2008/0178169 A1 Jul. 24, 2008

(51) Int. Cl.
*G06F 15/16* (2006.01)
*G06F 15/173* (2006.01)
*G06F 9/44* (2006.01)

(52) U.S. Cl. ........ 709/217; 709/224; 709/225; 709/226; 717/170; 717/120

(58) Field of Classification Search .................. 709/217, 709/226, 225, 224; 717/170, 120; 707/203, 707/3

See application file for complete search history.

(56) References Cited

U.S. PATENT DOCUMENTS

| 6,493,768 | B1 * | 12/2002 | Boutcher ...................... 719/330 |
| 7,380,003 | B1 * | 5/2008 | Guo et al. ..................... 709/226 |
| 2004/0111488 | A1 * | 6/2004 | Allan ............................ 709/217 |
| 2004/0168153 | A1 | 8/2004 | Marvin |
| 2006/0004722 | A1 * | 1/2006 | Betts et al. ........................ 707/3 |
| 2006/0080676 | A1 * | 4/2006 | Colgrave ...................... 719/318 |

OTHER PUBLICATIONS

Kenyon, "Web Service Versioning And Deprecation", SOA Web Services Journal, Jan. 21, 2003, downloaded on Sep. 6, 2006 from http://webservices.sys-con.com/read/39678_p.htm.
Brown et al., "Best Practices For Web Services Versioning", Jan. 30, 2004, downloaded on Sep. 6, 2006 from http://www-128.ibm.com/developerworks/webservices/library/ws-version/.

* cited by examiner

*Primary Examiner* — Carl Colin
*Assistant Examiner* — Peter Shaw
(74) *Attorney, Agent, or Firm* — Eckert Seamans Cherin & Mellott LLC

(57) ABSTRACT

Network service version management techniques are disclosed. Service access information, which is associated with access to a network service by a network service user, may be destined for a particular version of the network service. A determination is made as to whether a different version of the network service is accessible by the network service user. If so, then a further determination is made as to whether to select the different version of the network service to process the service access information. Any inconsistency between versions of the network service, such as different information requirements, can be handled by transforming received service access information. A replay function may also be provided, to have service access information again processed by the same or a different version of a network service. This function may be useful, for example, where a version of a service is rolled back or for debugging.

11 Claims, 4 Drawing Sheets

NETWORK SERVICE VERSION MANAGEMENT

CROSS-REFERENCE TO RELATED APPLICATIONS

The present patent application is related to each of the following patent applications, the contents of which are entirely incorporated herein by reference:

U.S. Utility patent application Ser. No. 11/549,149, entitled "NETWORK SERVICE USAGE MANAGEMENT SYSTEMS AND METHODS", and filed on Oct. 13, 2006;

U.S. Provisional Patent Application Ser. No. 60/815,134, entitled "SECURE DOMAIN INFORMATION PROTECTION APPARATUS AND METHODS", and filed on Jun. 20, 2006, and U.S. Utility patent application Ser. No. 11/467,387, filed on Aug. 25, 2006 and claiming the benefit thereof;

U.S. Provisional Patent Application Ser. No. 60/814,983, entitled "NETWORK SERVICE PERFORMANCE MONITORING APPARATUS AND METHODS", and filed on Jun. 20, 2006, and U.S. Utility patent application Ser. No. 11/557,287, filed on Nov. 7, 2006 and claiming the benefit thereof;

U.S. Provisional Patent Application Ser. No. 60/815,099, entitled "COMMUNICATION NETWORK APPLICATION ACTIVITY MONITORING AND CONTROL", and filed on Jun. 20, 2006, and U.S. Utility patent application Ser. No. 11/460,789, filed on Jul. 28, 2006 and claiming the benefit thereof;

U.S. Provisional Patent Application Ser. No. 60/814,963, entitled "SECURE COMMUNICATION NETWORK USER MOBILITY APPARATUS AND METHODS", and filed on Jun. 20, 2006, and U.S. Utility patent application Ser. No. 11/465,172, filed on Aug. 17, 2006 and claiming the benefit thereof.

FIELD OF THE INVENTION

This invention relates generally to network services and, in particular, to managing versions of network services.

BACKGROUND

Inter-business application or service integration has long been an important task for corporations in some vertical market segments. In general, services for which information is distributed through a communication network may be referred to as network services. "Web services" are an example of network services, and represent the next generation of technology being used for automatically exchanging information between different applications over the public Internet and many private networks. Web services provide a framework for building web-based distributed applications, and can provide efficient and effective automated machine-to-machine communications.

From a technology point of view, web services are network accessible functions that can be accessed using standard Internet protocols such as HyperText Transfer Protocol (HTTP), extensible Markup Language (XML), Simple Object Access Protocol (SOAP), etc., over standard interfaces.

The real power of web services technology is in its simplicity. The core technology only addresses the common language and communication issues and does not directly address the onerous task of application integration. Web services can be viewed as a sophisticated machine-to-machine Remote Procedure Call (RPC) technology for interconnecting multiple heterogeneous untrusted systems. Web services take the best of many new technologies by utilizing XML technology for data conversion/transparency and Internet standards such as HTTP and Simple Mail Transfer Protocol (SMTP) for message transport.

One of the primary drivers behind the development and standardization of web services is the ability to facilitate seamless machine-to-machine application-level communications by providing a loose coupling between disparate applications. Such a loose coupling of applications allows applications on different servers to interoperate without requiring a static, inflexible interface between them. Applications using very different technologies can interoperate using standard web services protocols.

Currently available web service products, however, may provide limited service and service version management features. For example, existing web service registry products are simple repositories of web services. Any change in such a registry can affect a web service client application, in that the client application may have to be updated in accordance with reported registry changes. Therefore, it is said that these client applications are "tightly-coupled" with a registry that is offering web services.

In addition, some exiting solutions for supporting the publishing of web services simply provide a single centralized registry for announcing the publication of a web service, with no support for a distributed and synchronized set of registries as may be required in a global corporation. Such web service registry products do not support distributed publishing or automatic rollback, for example. An application administrator is obliged to handle each service publishing and rollback operation manually, and is still unable to provide seamless versioning. Any errors in this process can have a significant business impact.

It has been proposed to handle web service versioning by keeping a version current in a Web Services Description Language (WSDL) document that is made available through Universal Description, Discovery and Integration (UDDI). This approach acknowledges that versioning can be a significant problem, and involves both forethought into namespace management and a manual stage of implementing software code at a router intermediary at the same time that a service is published.

Another suggested approach to version management would attempt to enable an application to automatically determine and consume the most recent version of a service by having both client applications and service provider applications support dynamic binding. A dynamic binding implementation, however, can be complex since it requires constant checking for tmodel updates from client applications. This also does not avoid the need for new development at client applications, or include any provisions for service rollback.

U.S. patent application Ser. No. 10/785,780, published on Aug. 26, 2004 as Publication No. 2004/0168153, describes deployment and management of differing versions of software components. Although updates to client applications can be avoided, all service requests received from clients are handled by either a single active version of a service or a version of the service specified in the request.

Thus, there remains a need for improved network service version management techniques.

SUMMARY OF THE INVENTION

Some embodiments of the invention provide new techniques for automatic web service publishing, promotion, and service version rollback and recovery, in such a system as a global Service Oriented Architecture (SOA) infrastructure that includes many different service mediation points distributed throughout a corporate Local Area Network (LAN) and/or other networks. A new way of service versioning may also be provided, such that a distributed registry can support multiple versions of a network service and also simultaneous usage of multiple available versions.

According to an aspect of the invention, an apparatus includes an interface and a version selection module. The interface enables service access information associated with access to a network service by a network service user to be received. The service access information is destined for a first version of the network service. The version selection module is operatively coupled to the interface and is operable to determine whether a second version of the network service, which is different from the first version of the network service, is accessible by the network service user, and to determine whether to select the second version of the network service to process the received service access information where the second version of the network service is accessible by the network service user.

The apparatus may also include a memory, operatively coupled to the version selection module, for storing an access policy associated with the network service, the access policy comprising an indication of whether the second version of the network service is accessible by the network service user. In this case, the version selection module may be operable to determine whether the second version of the network service is accessible by the network service user by consulting the access policy associated with the network service in the memory. The access policy may include an access policy that is established by a provider of the network service.

In some embodiments, the apparatus also includes a transformation module operatively coupled to the version selection module and operable to, where a determination is made to select the second version of the network service, determine whether second version of the network service is capable of processing the received service access information, and transform the received service access information for processing by the second version of the network service where the second version of the network service is not capable of processing the received service access information.

The first version of the network service may, for example, be older or newer than the second version of the network service.

A memory and a logging module that is operatively coupled to the memory and to the version selection module may be provided in some embodiments. The logging module is operable to store in the memory service access information, including the received service access information, for which a network service version selection has been made by the version selection module, to subsequently retrieve from the memory stored service access information for which one of the first and second versions of the network service had previously been selected, and to provide the retrieved service access information to the other of the first and second versions of the network service.

The apparatus may be implemented, for example, in a communication network element for providing access for a network service user to a network service.

A method is also provided, and includes receiving service access information associated with access to a network service by a network service user, the service access information being destined for a first version of the network service, determining whether a second version of the network service, which is different from the first version of the network service, is accessible by the network service user, and determining whether to select the second version of the network service to process the received service access information where the second version of the network service is accessible by the network service user.

The operation of determining whether a second version of the network service is accessible by the network service user may involve consulting an access policy associated with the network service. The access policy includes an indication of whether the second version of the network service is accessible by the network service user. As noted above, the access policy may be an access policy that is established by a provider of the network service.

Where a determination is made to select the second version of the network service, the method may also include determining whether the second version of the network service is capable of processing the received service access information, and transforming the received service access information for processing by the second version of the network service where the second version of the network service is not capable of processing the received service access information.

In some embodiments, one of the first version and the second version of the network service is a newer version of the network service.

The method may also include storing service access information, including the received service access information, for which a network service version selection has been made, retrieving stored service access information for which one of the first and second versions of the network service had previously been selected, and providing the retrieved service access information to the other of the first and second versions of the network service.

The method may be embodied, for example, in instructions stored on a machine-readable medium.

Another aspect of the invention provides a method that includes storing service access information that is associated with access to a network service and that has been provided to a version of the network service for processing, retrieving the stored service access information, and providing the retrieved service access information to a version of the network service for processing.

The operation of providing may involve providing the retrieved service access information to a different version of the network service than the version to which the service access information has been provided.

The method may also include determining whether the version of the network service, to which the service access information has been provided, has become unavailable. In this case, the operations of retrieving and providing may be responsive to a determination that the version of the network service, to which the service access information has been provided, has become unavailable.

Another aspect of the invention relates to a machine-readable medium storing a data structure. The data structure includes version information indicative of a version of a network service, and user information indicative of a network service user by whom the version of the network service is accessible. Such a data structure allows a determination to be made as to whether the version of the network service is accessible by a network service user from whom service access information, which is associated with access to the network service and destined for a different version of the network service, is received.

The network service is a web service in some embodiments.

Other aspects and features of embodiments of the present invention will become apparent to those ordinarily skilled in the art upon review of the following description.

BRIEF DESCRIPTION OF THE DRAWINGS

Examples of embodiments of the invention will now be described in greater detail with reference to the accompanying drawings.

DETAILED DESCRIPTION OF PREFERRED EMBODIMENTS

Figure 1:
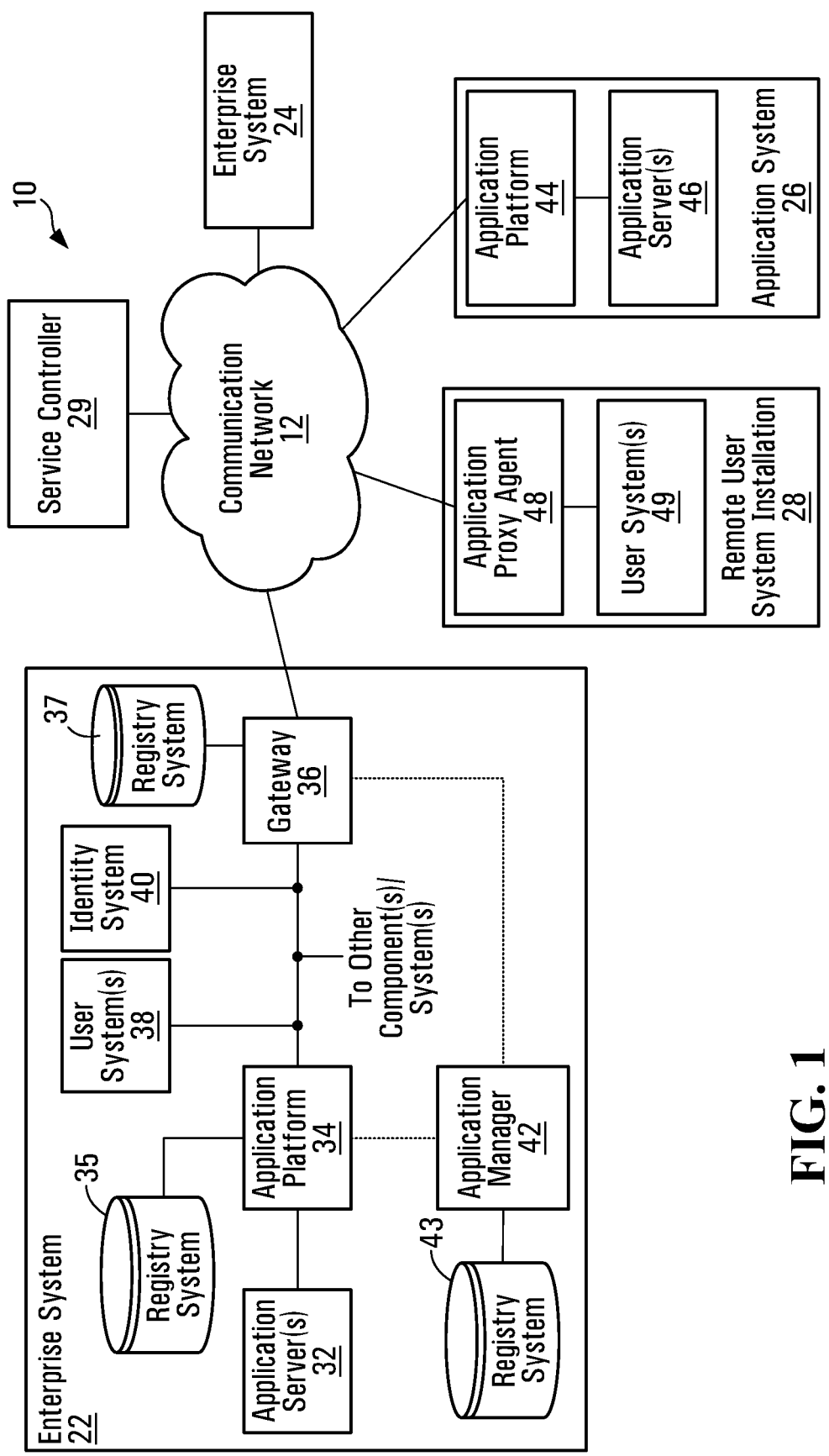
FIG. 1 is a block diagram of a communication system.

FIG. 1 is a block diagram of a communication system in which embodiments of the invention may be implemented. The communication system 10 includes a communication network 12, to which enterprise systems 22, 24, an application system 26, a remote user system installation 28, and an external service controller 29 are operatively coupled through respective communication links.

The enterprise system 22 includes one or more application servers 32, an application platform 34 operatively coupled to the application server(s), a gateway 36 operatively coupled to the application platform and to the communication network 12, one or more user systems 38 operatively coupled to the application platform and to the gateway, an identity system 40 operatively coupled to the application platform, to the user system(s), and to the gateway, and an application manager 42 operatively coupled to the application platform, and to the gateway. Service registry systems 35, 37, 43 are also provided, and operatively coupled to the application platform 34, to the gateway 36, and to the application manager 42, respectively. Other components or systems, such as firewalls located on either side of the gateway 36 to provide a DeMilitarized Zone (DMZ), may also be deployed in the enterprise system 22. The enterprise system 24 may have a similar structure.

In the application system 26, an application platform 44 is operatively coupled to the communication network 12 and to one or more application servers 46. The remote user system installation 28 includes an application proxy agent 48 operatively coupled to one or more user systems 49.

Although many enterprise systems, application systems, remote user system installations, external service controllers, and possibly other types of systems may be provided in a communication system, only illustrative examples of certain types of systems have been shown in FIG. 1 to avoid overly complicating the drawing. Internal details of the communication network 12, such as border or access equipment and core switching/routing components, and the enterprise system 24 have also been omitted from FIG. 1 for similar reasons. The type, structure, and operation of the communication network 12 may vary between deployments of embodiments of the invention. Other embodiments of the invention may also include enterprise systems, application systems, remote user system installations, and/or external service controllers that include fewer, further, or different components, with similar or different interconnections, than shown.

It should therefore be appreciated that the communication system 10 of FIG. 1, as well as the contents of the other drawings, are intended solely for illustrative purposes, and that the present invention is in no way limited to the particular example embodiments explicitly shown in the drawings and described herein.

Those skilled in the art to which the present invention pertains will be familiar with many different types of communication networks, including overlay networks such as application layer networks and more traditional infrastructures. The present invention is not limited to any particular type of communication network. In one embodiment, the communication network 12 is the Internet or some other public network.

Many examples of access technologies through which the systems 22, 24, 26, 28, 29 access the communication network 12 will also be familiar to those skilled in the art, and accordingly have not been separately shown in FIG. 1.

Considering first the enterprise system 22, an application server 32 supports one or more applications that may provide functions, illustratively services, for use by at least the local user system(s) 38. Where multiple application servers 32 are deployed, each server supports a respective set of functions or services, which may or may not overlap the services supported by other servers. References herein to services are intended to convey the notion of any such function. Generally, an application server 32 executes a software application to provide these functions. A service, such as a web service, is an example of an application function that is exposed to user systems, in the context of the present disclosure. Any references to applications, functions, and services should be interpreted accordingly.

In some embodiments, these functions are also made available for use by external user systems, such as user systems in the enterprise system 24, where owners or operators of the enterprise systems 22, 24 have an agreement for inter-system access by their users, and/or by the user system(s) 49 at the remote user system installation 28. The external service controller 29 may be involved in managing the usage of services, which are provided by service provider systems such as the application server(s) 32 within one administrative domain, by external user systems. It is also possible that the enterprise systems 22, 24, the application system 26, and/or the remote user installation 28 may be different sites of a corporate LAN or other distributed network. References herein to external users of network services should thus be interpreted as including users associated with external independently controlled systems or users associated with affiliated systems such as different sites of a distributed corporate network.

An application server 32 may include such components as one or more processors, one or more memory devices, and an interface for exchanging service access or transaction information, such as service request messages and corresponding responses, with user systems. Memory devices in an application server 32 may be used to store operating system software, application software, etc., for use by the application server processor(s). Enterprise systems such as 22 are often implemented as a network, in which case a network interface enables the application server(s) 32 to communicate with the user system(s) 38 and possibly other components of the enterprise system. In another possible implementation, an application server 32 includes separate interfaces for communicating with different enterprise system components.

A user system 38 may similarly include one or more processors, one or more memory devices, and some sort of interface(s) for communicating with the application server(s) 32, and possibly other components of the enterprise system 22. Operating system software, client software for interacting with the application server(s) 32, and/or other types of information may be stored in user system memory devices.

Those skilled in the art will be familiar with many different types of systems that provide and/or use network applications. Embodiments of the present invention relate primarily to managing the use of network services, as opposed to how these services are actually supported, and accordingly the application server(s) 32, the user system(s) 38, and their operation are described only briefly herein to the extent necessary to illustrate aspects of the invention.

The identity system 40 represents another component that is commonly provided in enterprise systems such as corporate networks and will be familiar to those skilled in the art. Access to services supported by the application server(s) 32 in many cases must be restricted to a particular set of users. The identity system 40, which may authenticate users and/or user systems through interaction with a Lightweight Directory Access Protocol (LDAP) directory or other type of user database, for example, supplies a digital identity that may be used for authorizing or denying access to network services.

In terms of structure, the application platform 34 includes application server interfaces that are compatible with the user system interfaces, illustratively Application Programming Interfaces (APIs), of the application server(s) 32, one or more interfaces compatible with the application server interface(s) of the user system(s) 38, and components for processing messages or other information received and/or transmitted through these interfaces. As described in further detail below, external user systems may be able to access the application server(s) 32 through the gateway 36, in which case the user system interface(s) of the application platform 34 may also enable the application platform to communicate with the gateway 36. However, in some embodiments, a separate gateway interface may be provided for this purpose.

The gateway 36 would also include one or more internal interfaces compatible with interfaces of other components of the enterprise system 22, one or more external interfaces for enabling communication signals to be transmitted and/or received through the communication network 12, and intermediate components for processing signals received and/or transmitted through the interfaces.

The application manager 42 represents a control and/or monitoring element that might not itself perform real-time processing of information as it is transferred between the application server(s) 32 and the local user system(s) 38 or external user systems. The application manager 42 may communicate with the application platform 34 and the gateway 36 through compatible interfaces, to perform such functions as configuring the application platform and/or the gateway, illustratively by downloading protection policies to the platform and/or the gateway for enforcement.

Information relating to available services, possibly including both local services provided by the application server(s) 32 and remote services provided by remote service provider systems such as the enterprise system 24 and the application system 26, may be stored in any or all of the registry systems 35, 37, 43, and may be accessible through any of various forms of interfaces. Each registry system 35, 37, 43 itself may be implemented in one or more memory devices, such as solid state memory devices and/or memory devices for use with movable and possibly removable storage media. The registry systems 35, 43 may store information relating to services provided by the application server(s) 32, whereas the registry system 37 may store information relating to both internal services and external services that are provided externally but available to the user system(s) 38, for example.

The internal components of the application platform 34, the gateway 36, and the application manager 42 may be implemented in hardware, software, firmware, or some combination thereof. An illustrative example of a subsystem that may be provided in or distributed between the application manager 42, the application platform 34, and the gateway 36 is described below with reference to FIG. 2.

In a traditional deployment of a so-called Service Oriented Architecture (SOA) for an enterprise network, SOA components are individually deployed and integrated on each application server. Although web service standards address the need to restrict service access to authorized users, a web services policy server would be needed to store and provide this information. Enforcing these policies can also be a challenge, in that software vendors may require substantial changes to applications and servers in order to adapt to enterprise systems.

All of this can represent a significant project for an enterprise, and may well have a relatively long implementation cycle. In addition, the skill set required to implement such a project is highly specialized, which might make an SOA implementation not economically feasible.

When extending web services or other types of applications to partners, between the enterprise systems 22, 24, for example, even more challenges exist for an SOA infrastructure deployed on application servers. For instance, applications deployed at partner sites might use diverse security mechanisms that cannot share user identity information freely, requiring translation of security tokens for users. Placing the burden of security token translation, or other security functions, on each application server tends to be costly and inefficient.

Data privacy requirements are also very difficult or even impossible to enforce at each application server since application servers themselves might not be aware of whether a user system, or more generally a consumer of its service, is external to its enterprise system.

XML-specific denial of service (XDoS) attacks, and possibly other threats, may be particularly problematic in application server-based SOA implementations. Web services, for example, are open to XDoS attacks, which cannot be effectively dealt with on application servers.

The migration of a server-based SOA to a web services model to achieve application interoperability via loosely coupling applications necessitates the need for additional messaging, illustratively in the form of SOAP headers and XML messages, as well as additional processing requirements for managing these messages. This additional overhead consumes network bandwidth and can result in significant new requirements for application server hardware.

An alternate model for deployment of an SOA infrastructure is to integrate the SOA components into enterprise network elements, as shown in FIG. 1. The application platform 34, the gateway 36, and the application manager 42 represent SOA components in the enterprise system 22.

Deploying the SOA infrastructure separately from the application server(s) 32 may provide several benefits: the SOA infrastructure is then application agnostic, applications require minimal modification, the SOA infrastructure is an end-to-end integrated solution, application server processing overhead is minimized, and network bandwidth can be optimized.

With an enterprise system-/network-based SOA deployment, any message translations required for applications to interoperate can be performed according to policies set within the enterprise system, not by the applications themselves. This allows translations to be defined independently of applications, removing the reliance on application vendor implementations.

The business logic required to adapt message format and content is thus provided by the enterprise, not by the application, minimizing application modification. Web services messages, for example, can be adapted within an enterprise network to achieve application interoperability. As new interoperability requirements arise, perhaps due to merger, acquisition, or the need to integrate with a new partner, no application modification is required. New policies for message translation can instead be defined to provide for the new interoperability.

An SOA infrastructure deployed as an integrated enterprise network solution can provide a single monitoring, control, and consolidated reporting point, illustratively the application manager 42. This can be important to enable proper corporate governance, continuous corporate improvement, and the ability to demonstrate compliance with regulations concerning data privacy and network security, for instance.

Application server processing requirements for application interoperability can be significantly reduced for two reasons: application server offload and a reduced number of required translations. Translations can be done once, at the application platform 34, for example, and then forwarded onto multiple destinations rather than each application performing its own translation.

The network bandwidth consumed by additional message traffic can be reduced by routing packets to the application server(s) 32 based upon inspecting the message SOAP headers, XML tags, or other message content. Routing can be sensitive to application contexts rather than based on static IP addresses, for example.

If application server functions are to be extended to partner enterprise systems, an SOA infrastructure deployed as enterprise network infrastructure may provide many further advantages. Translation of security tokens can be done once at the demarcation point between the partners' networks, illustratively at the gateway 36 for external accesses to the application server(s) 32, providing a single enforcement point for security policy. Data privacy can also be enforced at the point where data leaves a security domain, again at the gateway 36, for example. This drives efficiencies and reduces costs. In addition, denial of service attacks targeted at corporate web services can be defended at the gateway 36, the enterprise network edge, which is perhaps the most secure place to deal with this issue.

The application platform 34 provides an SOA infrastructure for integrating applications that traditionally have run as stand-alone applications, and may enable such capabilities as controlling and monitoring all activity initiated by a validated user to thereby allow generation of a consolidated audit trail, translation for message and document formats, managing the life cycle for applications including the staged rollout of web services and rollback to previous versions in the event of unexpected behavior for instance, and monitoring application/service performance to ensure that applications/services meet internal corporate requirements.

This listing of example functions of the application platform 34, like other functional examples noted herein, is by no means restrictive or exhaustive. Many functions may be implemented independently, every embodiment need not necessarily provide all functions, and other functions may also be or become apparent to those skilled in the art.

Benefits of the application platform 34 may include reduced application integration cost through minimum change to existing applications, as noted above, ensuring that access to corporate applications complies with Government regulations, a central monitoring and control point for employee access to web services, and continuous corporate improvement through consolidated reporting.

The gateway 36 effectively extends an intranet SOA provided by the enterprise system 22, through the communication network 12, into an extranet, allowing seamless integration with customers and partners without compromising security or privacy. Functions of the gateway 36 may include, possibly among others, any or all of extending applications to a partner extranet and branch locations, providing seamless mobility for partner access to applications, ensuring partner access to corporate applications complies with Government regulations, maintaining privacy of corporate identities without compromising traceability, and, in accordance with embodiments of the invention, network service version management.

In providing mobile access to the application server(s) 32 from any partner sites associated with the enterprise system 22, the gateway 36 may allow the secure identification of partner institutions and acceptance of identities between different security domains. Application message and data translations, for user systems associated with external partner sites, may also be provided by the gateway 36, while ensuring that all data remains private as per corporate policy. A consolidated audit trail of all application access may be collected and provided to an external partner enterprise system by the gateway 36, to demonstrate conformance with regulations for instance.

The application manager 42 may provide a central point for monitoring and control of the application platform 34, the gateway 36, and any other platforms and gateways (not shown) in the enterprise system 22. In some implementations, globally consistent policies for all applications, so as to ensure improved corporate governance and/or compliance with Government regulations or instance, can also be established through the application manager 42 and distributed to the application platform 34 and/or to the gateway 36 for enforcement. The central application manager 42 may also provide for globally consistent application, service, and/or service version change management.

As noted above, the enterprise system 24 may be substantially similar to the enterprise system 22.

The enterprise system 22 includes both application server(s) 32 that support applications and one or more user system(s) 38 that may use those applications. However, it should be appreciated that application servers and user systems need not necessarily be co-located. The application system 26, for example, includes one or more application servers 46, but no local user systems. Although only an application platform 44 is shown in the application system 26, some implementations of an application system might also include a gateway. Whereas the application system 26 as shown might be suitable, for example, for a remote data center that is associated with a primary data center as the enterprise system 22, a stand-alone or "unaffiliated" application system that hosts applications for use by external user systems might also include a gateway for handling authentication of the external users for instance.

The application platform 44 in the application system 26 may interact with the application manager 42 of the enterprise system 22, or more generally the application manager of an affiliated enterprise system. A local application manager may also be provided in a stand-alone application system. In some implementations, the external service controller 29 similarly interacts with SOA infrastructure components in multiple different administrative domains. For example, the external service controller 29 is operatively coupled to the communication network 12 and might configure the gateway 36 and a gateway in the enterprise system 24 to collect and exchange application performance statistics.

A user-only deployment is shown in FIG. 1 as the remote user system installation 28. The application proxy agent 48 allows the user system(s) 49 at a partner or branch location, for example, to use applications provided by remotely located application servers. In one embodiment, the application proxy agent 48 is a scaled-down version of the gateway 36, and may also include a registry system (not shown). The application proxy agent 48, like the gateway 36, might maintain privacy of corporate identities during authentication of the user system(s) 49 with the enterprise system 22 without compromising traceability, and support secure communications through the communication network 12 using tunneling techniques, for example, but need not necessarily be able to authenticate external users since the remote user system installation 28 does not host applications that could be used by external user systems.

The external service controller 29 provides for externally managed service offerings, but need not itself include or operate in conjunction with local service provider systems or user systems. In one embodiment, the service controller 29 includes an application manager and a registry system that are substantially similar to the application manager 42 and the registry system 43 in the enterprise system 22. However, where the service controller 29 does not actually participate in the transfer of information between service provider systems and user systems, its application manager might communicate with the communication network 12 through a simpler network interface than an enterprise system gateway such as 36. In addition, an application manager and a service registry system of an external service controller such as 29 may interact with multiple different enterprise systems, application systems, and/or remote user installations to provide an externally managed service offering.

It is expected that managed service offerings will be supported by external service controllers such as 29. However, it is possible that an application manager and/or other component(s) within an enterprise system could be configured to support a managed service offering.

In the system 10, a user at a user system 38 that wishes to make use of an application provided by an application server 32 is first authenticated by the identity system 40. Those skilled in the art will be familiar with many security schemes that may be used for this purpose, such as username/password authentication. Where remote access to an application server 32 is supported, user authentication may be handled by the gateway 36, possibly through interactions with an external identity system. The gateway 36 may also be involved in authentication when a user system that is associated with a partner enterprise system or site is locally connected to the enterprise system 22 and wishes to access an application server 32.

When a user has been authenticated, messages or other forms of information may be exchanged between a user system 38 and the application server(s) 32. A user may be allowed to access multiple applications after a single successful authentication. Information required for accessing a service may be obtained from a service registry system 35, 37, 43, or from another registry such as a registry system of the service controller 29 if a service in an externally managed service network is to be accessed.

As noted above, currently available web service products do not provide enhanced features such as automatic web service publishing, promotion, and service version rollback and recovery. These types of features can be important in a global SOA infrastructure to allow a corporation to manage the life cycle of its web services, or more generally network services, at an integrated and possibly distributed registry as shown in FIG. 1. For example, it may be desirable to provide support for a complete, integrated, composite set of methods for synchronizing network service publishing, versioning, rollback, and recovery from previous states. Also, there are no available products today that offer seamless interaction with a registry that enables features like service versioning and rollback.

Improved techniques for managing different versions of network services are thus needed. One or more of the application platform 34, the gateway 36, the application manager 42, and the external service controller 29 may participate in providing functions of embodiments of the invention.

Embodiments of the present invention may be implemented to provide such features as automatic network service publishing and promotion, service rollback and recovery, support for multiple versions of network services, and/or simultaneous usage of all available versions of network services. The concept of service publishing, in accordance with aspects of the invention, may be expanded to include service policy definition and downloading to policy enforcement points, automatic download of SOA artifacts to service mediation points, automatic updates to application routing and service selection policies, and/or an automatic starting of service monitoring or logging activities.

In the area of version management, some embodiments of the invention provide a novel idea of a network service rollback to a previously published version. At the same time as a service is rolled back, to disable usage of a newer version of the service, appropriate policies may also be automatically updated reflect the service rollback. This capability can be important to corporations in order to provide seamless updates and rollbacks to network services while they are in use, and without requiring "tightly coupled" updates to client software. In other words, client applications might be unaware of the service version that is actually in use, and therefore a service rollback operation can be totally transparent to network service users.

Illustrative embodiments of the invention are described in detail below first at the level of system 10 and subsequently with reference FIG. 2 in the context of an apparatus that may be provided at or distributed between any of various components of the system 10.

In the system 10, an SOA infrastructure is provided, and includes the application platforms 34, 44, the gateway 36, the application manager 42, and the application proxy agent 48. These SOA components may be provided as separate web services nodes, for example.

According to one possible implementation, the application manager 42 hosts a global registry system 43, and the application platforms 34, 44, the gateway 36, and the application proxy agent 48 form a set of service mediation and/or policy enforcement points. As noted above, a registry system (not shown) may be provided for the application proxy agent 48, and similarly another registry system (not shown) may also be provided for the application platform 44. A novel set of registry functionalities can then be provided in one possible transactional model.

In this type of model, an employee of a corporation that owns the enterprise system 22 might advertise a new service by initiating a service publish session with the application manager 42 or its registry system 43. A service policy may also be established for the service to control such aspects of service usage as access to the service, service monitoring, protection of information transferred during service transactions, etc., and published with the service. The application manager 42 automatically publishes the new service, along with any service policy, to mediation/enforcement points through which the new service can be accessed. For illustrative purposes, suppose that the new service is to be made available in the enterprise system 22 and to the user system(s) 49 in the remote user system installation 28. In this case, the application manager 42 may publish the new service to the application platform 34, to the gateway 36, and to the application proxy agent 48, illustratively through interactions with distributed registries such as 35, 37 in a combined Publish and Commit phase.

The local registry systems 35, 37 of the application platform 34 and the gateway 36, as well as a registry system (not shown) at the application proxy agent 48, thereby learn of the new service, while the associated SOA components 34, 36, 48 themselves start manipulating incoming service access information, such as SOAP traffic, related to the new service.

At some later time, a new version of the service might be developed. The new version, and also a new or revised policy associated with the service or with the new service version in particular, can be published in a substantially similar manner. For a phased rollout of the new service version, only a limited group of network service users would be upgraded to use and benefit from the newly created service version. The new service policy might specify the users to whom the new service version is to be accessible, for example.

At least the SOA components that serve these end users can be informed of the new service version by means of a new service publishing transaction. Seamlessly, the SOA components themselves can then start manipulating service access information associated with usage of the service by those users in accordance with any new service parameters, and a new WSDL description, new SOA artifacts, and the new service policy.

A decision may subsequently be made that the new service version should be removed. The new version might not be sufficient to satisfy requested or desired service requirements for which the new service version was deployed, for example. A rollback to the previous version can then be requested by an administrator or other personnel through the application manager 42. The rollback may be executed by means of a new service advertisement towards the SOA components to which the new service version was published. What is advertised for a service rollback, however, is a previous service version. The affected SOA components thereby learn that they are to comply with the previous service version, and start manipulating service access information associated with the service based on the previous service version, using the previous service description, policy, WSDL, and artifacts such as schemas, XSLT transforms, etc.

A recovery process may also be provided. Previously received and stored service access information such as service request messages or other types of service calls can be retrieved and replayed to a version of a service. This replay feature might be useful not only for service rollback, but also in the event of a service interruption, where a service is temporarily unavailable and is later restored, and/or for debugging.

Deployment of these features may thus affect the functionality of any or all SOA components. In the system of FIG. 1 and the above example of a service that is provided by an application server 32 and is available to the user systems 38, 49, any or all of the application platform 34, the gateway 36, the application manager 42, and the application proxy agent 48 may participate in various aspects of service version management, from service inception and usage until in some cases rollback and possibly recovery. In some embodiments, much of the actual data processing involved in service version management is performed at the gateway 36, although it should be appreciated that other components of a communication system may also or instead perform some or all of the functions described in detail herein.

Apart from a basic service registry, two other components, which may be implemented in hardware, software, firmware, or combinations thereof, may be added to a registry framework. These components are introduced for resolving additional technical issues that may arise from introducing versioning and rollout/rollback/recovery features. A versioning access policy component or subsystem may be added to a registry architecture to specify service visibility for each user, along with the version(s) assigned to each user. User/version access restrictions may be specified in service policies, as noted above. A service policy enforcement component may also be added to an overall registry or SOA architecture, in order to control each user's access and actions to be taken at a datapath, such as when service versions change between two SOAP requests.

In summary, the following phases may be occurring, at the gateway 36 for instance, during service publishing, rollout, rollback, and recovery events:

Service Rollout Phase: allows a registry to roll out a network service version;

Seamless Version Rollout Phase: allows seamless registry rollout for a new network service version;

Service Inquiry Phase: allows a user to discover a new network service;

Service Access Phase: involves a transfer of service access information, illustratively a SOAP service request, from the user—the request may be resolved by determining the version of the service that the user will access and then routing the request to the appropriate version of the network service;

Seamless Version Rollback Phase: allows seamless registry rollback to a previous network service version;

Recovery Phase: allows collection of logs, so that SOAP messages or other forms of service access information can be selectively replayed through a version of a network service for recovery purposes.

Illustrative examples of these new components and phases according to embodiments of the invention are described below.

Figure 2:
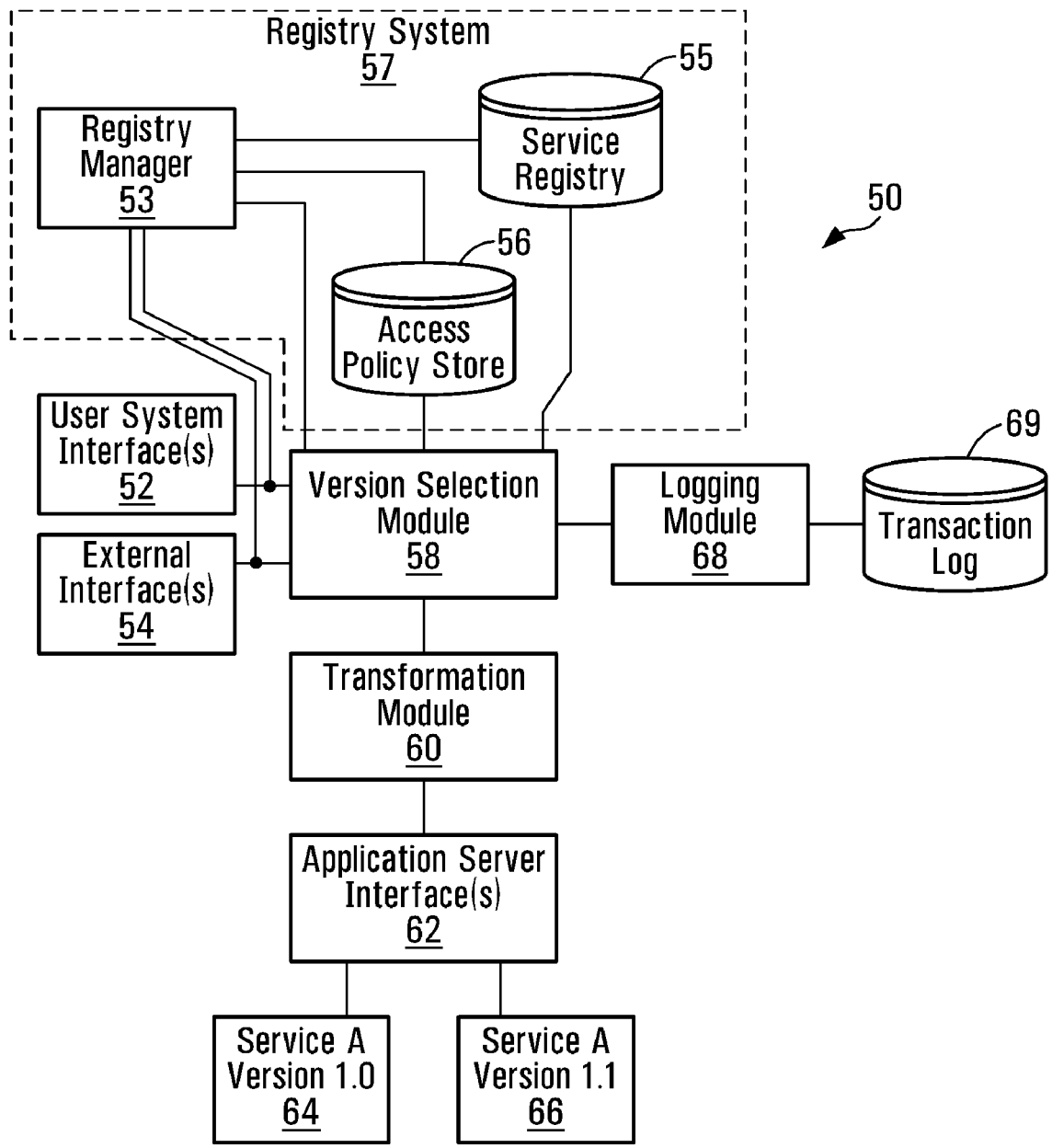
FIG. 2 is a block diagram of a network service version management apparatus.

FIG. 2 is a block diagram of an apparatus according to an embodiment of the invention. The apparatus 50 includes one or more user system interface(s) 52, one or more external interface(s) 54, a version selection module 58 operatively coupled to the user system interface(s), to the external interface(s), to an access policy store 56, to a logging module 68, and to a transformation module 60, one or more application server interface(s) 62 operatively coupled to the transformation module and to one or more application servers that support versions 64, 66 of a service A, and a transaction log 69 operatively coupled to the logging module. The access policy store 56 in the example shown is part of a registry system 57, which also includes a registry manager 53 that is operatively coupled to the user system interface(s) 52, to the external interface(s) 54, and to the version selection module 58, and a service registry 55 that is operatively coupled to the registry manager and to the version selection module.

As noted above with reference to FIG. 1, the contents of the drawings are intended solely for the purposes of illustration. A device or system, such as an SOA component, in which the apparatus 50 is implemented may include additional elements that have not been explicitly shown, for example. These elements might take various forms depending on the point at which, or the device(s)/system(s) in which or in conjunction with which, the apparatus 50 is implemented. In general, other embodiments of an apparatus may include further, fewer, or different elements than explicitly shown, with similar or different interconnections.

It should also be appreciated that elements might operate differently depending on their location. For example, an application manager 42 (FIG. 1) might be responsible for distributing service and policy information to other SOA components such as the application platform 34, the gateway 36, and the application proxy agent 48. The registry manager 53 in an apparatus 50 implemented at such a central registry point might support a service/policy information distribution function, whereas the registry manager for a distributed registry point might not support such a function or not have this type of function enabled.

The types of connections through which the components of FIG. 2 are operatively coupled may, to at least some extent, be implementation-dependent. Electronic devices often use various types of physical connectors and wired connections. In the case of cooperating software functions, for example, an operative coupling may be through variables, registers, or commonly accessed areas of a memory, and thus include a logical coupling.

Hardware, software, firmware, or combinations thereof may be used to implement elements of the apparatus 50. Processing devices such as Network Processors (NPs), microprocessors, microcontrollers, Programmable Logic Devices (PLDs), Field Programmable Gate Arrays (FPGAs), Application Specific Integrated Circuits (ASICs), and other types of "intelligent" integrated circuits may be suitable for this purpose.

The apparatus 50 may interact with other devices or systems through the interfaces 52, 54, 62. These interfaces may be of the same type or different types, or even be the same interface where the same communication medium is used for information transfers with all other components. However, in many implementations, it is likely that the user system interface(s) 52 will differ from at least the application server interface(s) 62, and that multiple application server interfaces of different types may be provided for different application servers. The external interface(s) 54 may include one or more interfaces, possibly of other different types.

A user system interface 52 enables the apparatus 50 to exchange at least service access information such as web service messages with user systems. Where a system administrator or other personnel publishes network services using a user system, service/policy information may also be exchanged with the registry system 57 through a user system interface 52. An external interface 54 may enable service access information, and possibly service/policy information when the apparatus 50 is implemented at a central or distributed registry point, to be exchanged with external devices or systems, illustratively systems located in a different enterprise system or user system installation. Each application server interface 62 allows the apparatus 50 to exchange application access information with a respective set of one or more local application servers.

This type of architecture for the apparatus 50 might be appropriate, for example, when the apparatus is implemented at a gateway. However, it should be appreciated that other implementations are also possible. For an implementation of the apparatus 50 at the application platform 34 (FIG. 1), for example, the external interface(s) 54 might include an interface that is compatible with the gateway 36 rather than the communication network 12. Thus, the types and numbers of the interfaces 52, 54, 62 might vary depending upon the location of the apparatus 50.

The structure and operation of the interfaces 52, 54, 62 will be dependent to at least some extent on the communication media and protocols used in information transfers. Those skilled in the art will be familiar with many types of interfaces through which service access information may be received and/or transmitted by the apparatus 50. Any of various types of interfaces may similarly be used to transfer service/policy information. These interfaces may also vary depending on where in an enterprise system or other administrative domain the apparatus 50 is implemented, as noted above.

It should be appreciated, for example, that the apparatus 50 need not itself be actively involved in transferring service access information such as service messages. A version selection module 58 at a gateway might passively "listen" for service messages without having any involvement in actually routing such messages into or out of an enterprise network for instance. Thus, version management could be implemented as a control or management plane function that might affect how traffic is handled at a datapath, but need not necessarily be part of that datapath. Where the version selection module 58 is not part of a datapath, traffic flow between the interface(s) 52, 54, 62 would not be through the version selection module 58 as shown in FIG. 2.

The service registry 55, the access policy store 58, and the transaction log 69 may be provided in one or more memory devices. Solid state memory devices are common in electronic equipment, and each of these elements may be implemented using one or more memory devices of this type. However, other types of memory devices, including memory devices for use with movable or even removable storage media, may also or instead be used for this purpose.

Other elements of the apparatus 50 may be implemented using hardware, software, and/or firmware. Based on the descriptions of these components provided herein, a person skilled in the art will be enabled to implement service monitoring techniques according to embodiments of the invention in any of various ways.

As described briefly above, rollout of a network service version is seamless from a user perspective in some embodiments. When a new version is available, registries are updated. Registry updates may be made at the control or management plane, but result in revised data handling in the data plane, such that control or management plane updates percolate to the data plane.

A new service can be made available by publishing the service in the service registry 55. An associated access policy for controlling access to the service may also be established and stored in the access policy store 56. In some embodiments, the access policy for a service or a version of a service is part of a more comprehensive overall service policy and is stored along with the service policy. Thus, references herein to an access policy are intended to cover any of various forms of access control information, which may be specified in an explicit access policy or within an overall service policy.

As described above, service publishing may be accomplished, for example, through a Publish session that is initiated with a registry system. Registry management functions such as service publishing are handled by the registry manager 53 in the apparatus 50. The registry manager 53 may thus receive service/policy information for a new service from an administrator terminal or a user system being used by service provider personnel, through a user system interface 52 for instance.

In a distributed registry deployment, a central registry system may disseminate the new service to other registry systems, such as registry systems at other SOA components. Where the apparatus 50 is implemented at a central registry point, the registry manager 53 also determines whether received service/policy information is to be forwarded to other registry systems, and if so, forwards the service/policy information to those other registry systems. The registry manager 53 might consult a service access policy to identify users that are authorized to access the service, identify based on user profiles or other records the SOA components such as gateways or proxies that serve those users, and then forward the service/policy information to the identified gateways and/ or proxies.

A registry manager 53 at a distributed registry point may support at least service publishing functionality to allow network services to be published to its service registry 55 and service access policies to be added to its access policy store 56. In this case, service/policy information would be received through an external interface 54 rather than through a user system interface 52.

Rollout of a new version of an existing network service may also be seamless. The management plane of an SOA component could be used to update a mapping between network service versions and users, for example. This information is then effectively percolated down to the data plane when a new version of a network service is rolled out. An end user, however, need not even be aware that version/user mappings have changed. This is described in further detail below.

As in any registry system, the registry system 57, and the registry manager 53 in particular, may provide a control path inquiry phase to allow a user's client software application to ask for communication information associated with a service. Through a user system interface 52, the registry manager 53 may receive an inquiry relating to the network service A, illustratively a web service $WS_A$. A UDDI Inquiry, for example, may take the form of a SOAP message that is sent through a datapath of an SOA component such as the gateway 36 (FIG. 1). The inquiry is then handed off to the registry manager 53, which is a control or management layer element in some embodiments. The registry manager 53 may work in tandem with the version selection module 58 and the service registry 55 to provide a WSDL file and/or other service information in response to the user inquiry. The version selection module 58 may thus be active at the inquiry stage, and may thereby participate in returning the service information for an appropriate version of a service to a requesting user.

Once a user has obtained service information for a service, such as a WSDL file, service access can be initiated. A SOAP Request message might be sent by the user and received through a user system interface 52. Where the apparatus 50 is implemented in a gateway such as 36 (FIG. 1) that serves the requesting user, the request is received by the gateway. The gateway may then authenticate the user by verifying the user's credentials. Authentication is one example of an operation that may be handled by an element that could be provided in a device or system in which or in conjunction with which the apparatus 50 operates.

If the user is successfully authenticated, or in some cases the user may have already been authenticated before the request was received, a determination is then made by the version selection module 58 as to whether the user has access to the service, and which version of the service the user should access. Version selection is performed "behind the scenes" or seamlessly from the perspective of the user. The received request is then routed to the selected version 64, 66 of the service. Actual routing of the request may be performed by the version selection module 58, or by a datapath routing element where the version selection module is provided as a control or management plane element.

Normally, service access information that is associated with access to a network service would be destined for a particular version of the network service. At a client software application, an identifier or other information such as a URL is included in a service request or other form of service access information to indicate the version for which the client application is adapted.

The version selection module 58, however, determines whether a different version of the network service is accessible by a network service user, and if so, makes a determination as to whether the different version of the network service should be selected to process service access information received from that user. The different version could be a newer version or an older version of the service, for example. In some embodiments, the version selection module 58 may be configured to automatically select a newer version of a service that is accessible to a user. It is also contemplated, however, that actual service availability and/or other conditions may be taken into account when making this determination, such that a different accessible version need not always actually be selected.

An access policy associated with a network service, stored in the access policy store 56, may provide an indication of the version(s) of a service that a user can access. The version selection module 58 can then determine whether a different version of the network service is accessible by a user by consulting a stored access policy for the service. As discussed above, an access policy for a service may be established by a provider of the network service, during a service or version rollout phase for instance.

Different versions of a network service are supported by different sets of server-side software code. The software code for two versions of a service may be substantially similar, but would have at least some differences in functionality. A newer version of a network service would typically provide additional functions, for example. Different network service versions may also have different mechanisms, illustratively different APIs, for interacting with users.

Inconsistency between the interaction mechanisms of different versions of a network service are handled by the transformation module 60. When the version selection module 58 selects a different version of a network service to process received service access information, the transformation module 60 determines whether the selected version of a network service is capable of processing the received service access information. The transformation module 60 also transforms the received service access information for processing where the selected version of the network service is not capable of processing the received service access information in the form in which it was received. This may involve setting a default value for an additional parameter that is required by the selected version but was not supplied in the received information, applying an XSLT transformation, and/or performing some other transformation so as to provide the selected version of the network service with service access information that is in an appropriate form.

The logging module 68 and the transaction log 69 allow service access information, for which a version selection has been made, to be stored and later retrieved and "replayed" to the same or a different version of the network service. This may be useful, for example, in recovering from a temporary interruption in a network service or from a version rollback, or in debugging service software code. In the case of a temporary interruption, a request or other service access information might again be forwarded to the same version when that version becomes available. For a version rollback, however, a different version of the network service would be selected for processing the retrieved service access information. Debugging may involve replaying service access information to the same version of a service to reproduce an error and/or to a different version of a service to test a bug fix, for example.

In the apparatus 50, the logging module 68 provides retrieved service access information to the version selection module 58, which selects a network service version for processing the retrieved information. The logging module 68 may itself provide retrieved service access information to a version of a network service in other embodiments.

The particular logged information that is retrieved and replayed is selectable in some embodiments. The version to which retrieved information is replayed could similarly be selectable. In FIG. 2, for example, transactions that were logged from version 1.1, 66, of service A could be replayed to version 1.0, 64, once version 1.1 is taken offline.

The replay process, including selection of service access information and a service version for instance, is controlled by an administrator or other personnel in some embodiments. An administrator might use a Graphical User Interface (GUI) or a Command Line Interface (CLI) to select specific service access information for replay to a particular version of a service. Such selections and other control information could be provided to the apparatus 50, illustratively to the version selection module 58, to the logging module 68, and/or to the transaction log 69, through a user interface 52, an external interface 54, or some other type of interface, depending on how an administrator interacts with the apparatus 50.

Automatic replay operations are also contemplated. The version selection module 58 or possibly another element may monitor the availability of service versions. A version of a service might become unreachable due to a connection or interface failure, for example. A problem of this type might be detected when a monitoring element fails to receive a response from a service version within a certain amount of time after sending a "ping" or other periodic query or message to that service version. Previously received and stored service access information could be automatically retrieved and replayed to a different version of the service by the version selection module 58 when a problem is detected in a version that had previously been selected to process the retrieved information. This type of replay could be delayed by a certain amount of time after problem detection, to allow some time for the service version to recover from the detected problem. Replay to the same version could be initiated when recovery of the service version is detected, with replay to a different version being initiated if recovery of the service version from the problem is not detected within the delay time period.

In some embodiments, an administrator of an SOA component or other personnel may enable or disable the logging module 68. The level of detail according to which transactions are logged may also be controllable. For the purposes of recovery, service access information is logged by the logging module 68. However, other information may also be logged by the logging module 68 in some embodiments, such as to aid in reporting and/or other purposes. The contents of the transaction log 69, which may include service access information and possibly other information, can thus potentially be used not only for replay and recovery, but also for analysis, by a network service administrator or other personnel for instance.

Seamless rollback can be another important feature that is provided in some embodiments. A network service might be designated, when it is first made available for instance, to be rolled out seamlessly. This type of designation could be included with service/policy information that is provided when a service is first published. Such a service may then also be rolled back seamlessly. It should be appreciated, however, that the apparatus 50 may be configured to handle rollout and/or rollback of any or all services seamlessly. An explicit designation of a service for seamless rollout might not be made in all embodiments.

In a substantially similar manner as network service versions are seamlessly rolled out, versioning information for a version rollback can be updated at the control or management plane, and then effectively percolates to the data plane. As with a seamless rollout, a seamless rollback is transparent to an end user. In the event that version 1.1, 66, of service A is taken out of service, requests from users of a client application that is adapted to version 1.1 are automatically routed to version 1.0, 64, since version 1.1 is no longer available.

This type of seamless aliasing between versions of a network service allows for intelligent replay of service calls. The version selection module 58 has the capability to select a different version of a network service for either newly received service access information or previously stored and retrieved service access information. Thus, service access information could potentially be received by the version selection module 58 through an interface 52, 54 or from the logging module 68.

Considering the overall operation of the apparatus 50 in the context of an example of a web service, a request to a web service A, $WS_A$, is made by sending a request in the form of a SOAP message to a destination URL as specified in the WSDL of $WS_A$, i.e., $WSDL_A$. Once the user has been authenticated, the version selection module 58 determines with which web service the received request is associated, such as by performing a reverse lookup for the specified URL, to thereby determine which web service the user intends to access. If a particular version, such as version 1.1, 66, of $WS_A$ is mapped for the user, as described in further detail below, the destination URL from the request can be cross-checked. If the values do not concur, which would occur if the user's client application is adapted for version 1.0, 64, then a URL translation can be performed. The received request, or a transformation of the received request if the received request does not contain correct or complete parameters for the selected version of $WS_A$, is then routed to the selected version of $WS_A$, which is version 1.1, 66, in this example.

Thus, a client or user of $WS_A$ sends a request to $WS_A$ using the API specified by the $WSDL_A$, which it would have obtained during an inquiry. Unbeknownst to the user, the request will be handled by $WS_A$ version 1.1, 66, and not by version 1.0, 64. Furthermore, where the API of version 1.1, 66, is different from the API of version 1.0, 64, the particular method the user's client application software was calling might require different and/or additional parameters. Version 1.0, 64, might require parameters a and b, which would be included in the request, whereas version 1.1, 66, requires an additional parameter c, for instance. In this case, the transformation module 60 can perform an XSLT or other type of transformation on the request, which is a SOAP message in this example, to massage any received parameters to adhere to the new interface as specified by $WS_A$ version 1.1, 66, and/or append a default value of the additional parameter c in a method call. This feature enables new versions of a service to be rolled out seamlessly. When the API itself does not change, however, the rollout of a new version of $WS_A$ does not require any modification of the parameters behind the scenes by the transformation module 60.

The benefits of a seamless rollout approach may be increasingly important in testing and benchmarking the performance of a new version of a web service. Administrators and other personnel can utilize the seamless rollout functionality to route traffic without influencing user systems. Users can be designated in service policies to have access to a particular version of a network service. In this way, bugs can be analyzed, new builds can be tested, and performance of those new builds can be monitored. This can be used as a precautionary measure before fully deploying a new version of a network service for all users.

Version selection, dynamic routing, and transformation may also or instead be used to provide seamless rollback. A service request destined for version 1.1, 66, could be transformed if necessary by removing additional parameters that are not required by version 1.0, 64, for example, where version 1.1 is rolled back. As described above for service rollout, no updates would be necessary at a user system where the version selection module 58 and the transformation module 60 handle dynamic routing and transformation operations. Previously received and processed requests and/or other service access information may be replayed to an older version of a service in the event of a version rollback.

Figure 3:
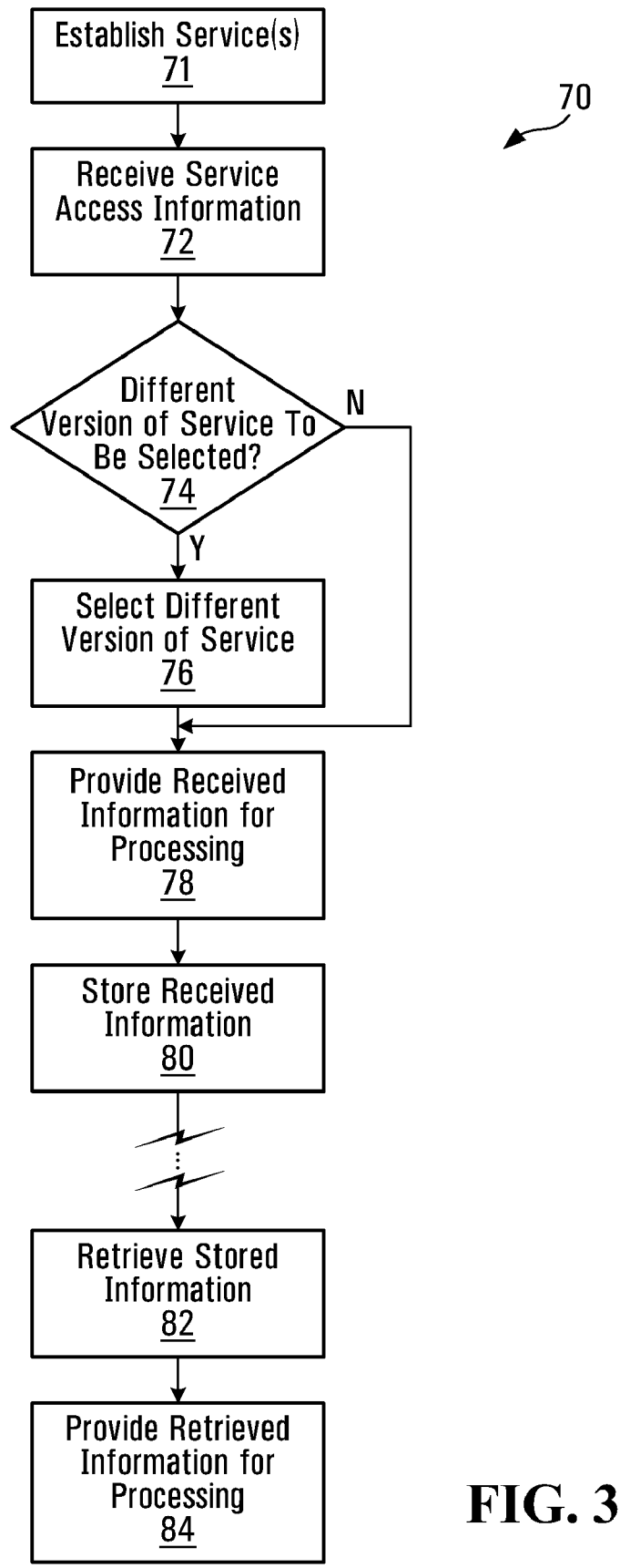
FIG. 3 is a flow diagram illustrating a network service management method.

FIG. 3 is a flow diagram illustrating a network service management method. In the method 70, one or more service(s), and possibly multiple versions of the service(s), are established at 71. This may involve registering and distributing service/policy information, as described above.

At 72, service access information associated with access to a network service by a network service user is received. The service access information may be destined for a particular version of the network service. A determination is then made at 74 as to whether a different version of the network service is to be selected to process the received service access information. This may involve, for example, determining whether a different version of the network service is accessible by the network service user, based on a service access policy for instance. Other criteria such as service version availability may also be used in determining whether the different version of the service should be selected.

Depending on the determination at 74, a different version of the network service may be selected at 76. The received service access information is then provided at 78 to either the version to which the received information was destined or the selected different version for processing. In some embodiments, the determination and selection at 74, 76 are control or management plane operations, and actual routing of service access information at 78 takes place in the data plane.

Where a determination is made at 74 to select a different version of the network service and the different version is selected at 76, the operation at 78 may involve determining whether the different version of the network service is capable of processing the received service access information, and if not, transforming the received service access information for processing by the different version of the network service.

Some embodiments of the invention may support functions such as version recovery and debugging, by storing service access information for which a network service version selection has been made. This is shown in the method 70 at 80. At some later time, such as when a newer version of a network service has been rolled back, when a version of a network service has been restored after a temporary interruption for instance, and/or when a version of a service is to be debugged, the stored service access information is retrieved at 82 and provided to a version of the network service for processing at 84. The retrieved information may be provided to another version of the network service, which may or may not be one of the versions that were available when the determination at 74 was originally made. The set of available versions of a network service may have changed since service access information was stored at 80, for example. It should also be appreciated that retrieved service access information may possibly be provided for processing at 84 to the version to which it was originally provided at 74. Although recovery after a version rollback might be the primary use of replay functionality, recovery after a temporary interruption in availability of one version of a service, as well as debugging, are other possible applications of this feature.

The method 70 is illustrative of one embodiment of the invention. Other embodiments may involve performing fewer, additional, or different operations, and/or performing operations in a different order than shown. For example, received service access information could be stored at 80 before it is provided for processing at 78. Operations that are shown separately in FIG. 3 could similarly proceed in parallel. New service access information could be received and the operations at 74, 76, 78, 80 could be performed for the newly received information while previously stored information is being retrieved for replay, for instance. New services and/or versions could also be established while any of the other operations in the method 70 are being performed.

Further variations of the method 70 may be or become apparent to those skilled in the art.

Figure 4:
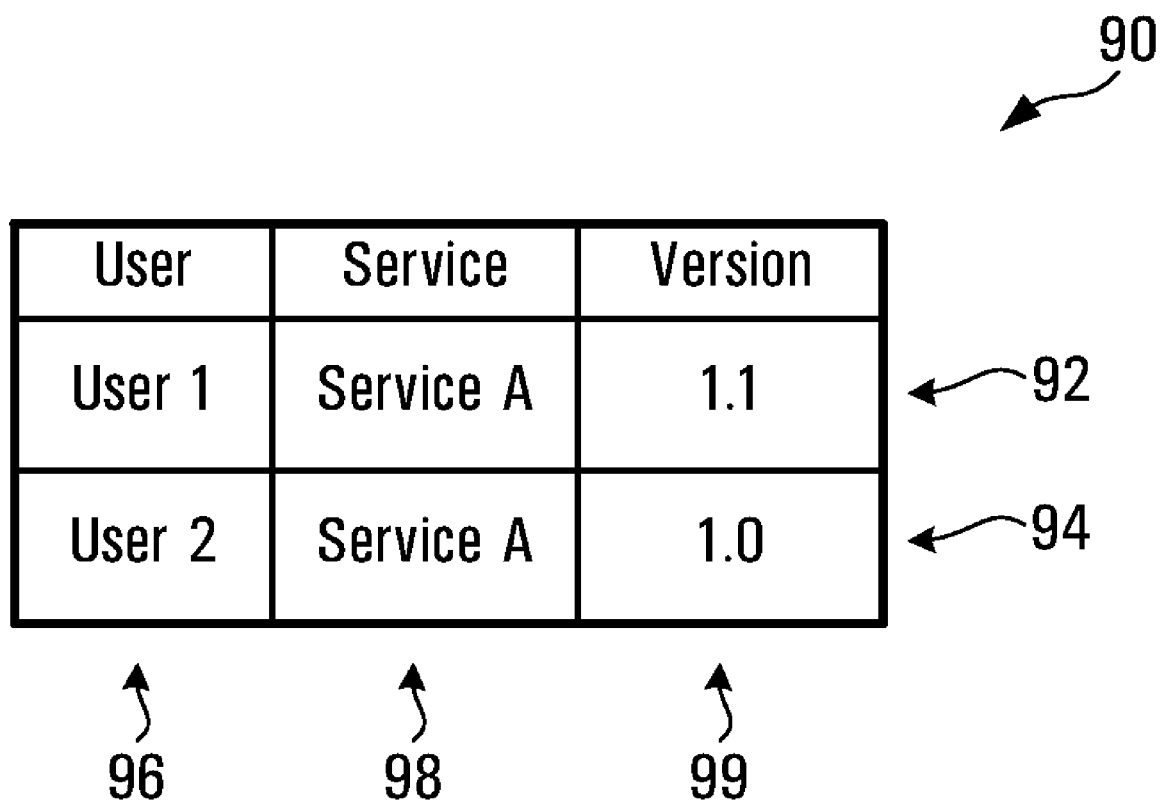
FIG. 4 is a block diagram of a data structure.

Embodiments of the invention have been described above primarily in the context of systems, apparatus, or methods. FIG. 4 is a block diagram of a data structure in accordance with another aspect of the invention. The data structure 90 represents an example of a format in which user/version mappings might be specified, and is arranged as a table which includes per-user records 92, 94. Each per-user record 92, 94 includes user information 96 that is indicative of a network service user, an identifier 98 of a service, and version information 99 indicative of a version of the network service identified at 98.

The user information 96 may include a user name, address, or other identifier. The service identifier 98 may be a service or application name, for example. Version information 99 might specify a particular service address such as a URL, and/or other information that identifies a version of a service.

The data structure 90 is intended to illustrate examples of the types of information that may be stored to enable a determination to be made as to whether a version of a network service is accessible by a network service user from whom service access information, which is associated with access to the network service and destined for a different version of the network service, is received. It should be appreciated, however, that the present invention is in no way limited to the particular data structure contents, order, or format shown in FIG. 4. For example, instead of per-user records 92, 94, user/version mappings could be specified in per-version records. A per-version record might include version information that is indicative of a version of a network service and user information that is indicative of each network service user by which the version is accessible. A service identifier could also be provided in per-version records.

Another possible variation would provide a respective table for each service, in which case a service identifier 98 need not be specified in each record.

In addition, multiple records need not be provided in a tabular format. A single record mapping one user to one version of a network service might be provided in some embodiments, where only one user is to have access to a new version of a network service for instance.

Further variations of the data structure 90 might include fewer, additional, or different fields, and/or an arrangement of fields in a similar or different order than shown.

An enterprise or other provider of network services may implement embodiments of the invention so as to provide such features as automatic web service publishing, promotion, and service version rollback and recovery in a global SOA infrastructure. A corporation can manage the life cycles of its web services, or more generally its network services, at an integrated distributed registry that supports a complete and integrated composite set of methods for synchronizing service publishing, versioning, rollback, and recovery from previous states.

Currently available products do not allow an enterprise to offer seamless interaction with a registry that advertizes features such as service versioning and rollback.

Using the techniques disclosed herein, application administrators can be provided with a unique ability to benefit from automatic service publishing, promotion, and service version rollback and recovery when managing a global SOA infrastructure in mission critical environments. A new way of service versioning can also be implemented using a distributed registry that supports multiple versions of a network service and also simultaneous usage of all available versions. Existing solutions for supporting the publishing of web services, for example, simply provide a single centralized registry for announcing the publication of a web service with no support for a distributed and synchronized set of registries as may be deployed in a global corporation.

According to the teachings provided herein, the network service version update process can be automated, including distribution of SOA artifacts to intermediary nodes, and can incorporate automatic rollback functionality.

Embodiments of the present invention may also provide significant cost reduction in operational overhead for a distributed SOA infrastructure, and reduced risk of failure in mission critical environments deploying network services.

More generally, embodiments of the invention can be used to provide the complete functionality of an SOA infrastructure as follows, for network services such as web services:

Corporate Governance: provides monitoring, control and reporting to ensure compliance with regulations and supports continued corporate improvement;

Managed Partner Extranet: secured seamless publishing and consumption of web services with partners and branch locations;

Web Service Performance: ensures availability and performance of web services as per corporate requirements or Service Level Agreements (SLAs);

Corporate Agility & Application Sensitivity: provides application-level routing and message translation based on content of SOAP headers, XML tags, or other message content;

Application Security: provides application-level security by ensuring messages are well formed, detecting XML-based attacks and enforcing application data encryption policy;

Life Cycle Management: provides controlled publishing of web services with rollback;

System Features: provides reliability, scalability, and compliance with open standards.

These and other functions have been disclosed herein, and/or in one or more of the above-referenced related patent applications.

What has been described is merely illustrative of the application of principles of embodiments of the invention. Other arrangements and methods can be implemented by those skilled in the art without departing from the scope of the present invention.

For example, as noted above, the present invention is in no way limited to the particular divisions of functions, method steps, or data structure contents shown in the drawings and explicitly described above.

In addition, although described primarily in the context of methods and systems, other implementations of the invention are also contemplated, as instructions stored on a machine-readable medium, for example.

We claim:

1. An apparatus comprising:
an interface enabling a service request associated with access to a network service by a network service user to be received from the network service user, the service request being destined for a first version of the network service;
an access policy store for storing an access policy associated with the network service, the access policy comprising an indication of whether a second version of the network service, which is different from the first version of the network service, is accessible by the network service user;
a version selection module operatively coupled to the interface and to the access policy store, and operable to determine, by consulting the access policy associated with the network service in the access policy store, whether the second version of the network service is accessible by the network service user; to determine whether to select the second version of the network service to process the received service request where the second version of the network service is accessible by the network service user; to select one of the first version and the second version of the network service; and to cause the received service request to be provided to the selected one of the first version and the second version of the network service for processing;
a transformation module operatively coupled to the version selection module and operable to determine whether the second version of the network service is capable of processing the received service request where a determination is made to select the second version of the network service; and to transform the received service request for processing by the second version of the network service where the second version of the network service is not capable of processing the received service request;
a memory; and
a logging module operatively coupled to the memory and to the version selection module and operable to store to the memory service requests, including the received service request, which have been provided for processing to one of the first version and the second version of the network service that has been previously respectively selected for the service requests by the version selection module, the selected one of the first version and the second version of the network service being available for processing the received service request when the received service request is stored to the memory; to determine whether the selected one of the first version and the second version of the network service, to which the received service request has been provided, has become unavailable; and, responsive to a determination that the selected one of the first version and the second version of the network service has become unavailable and independent of further action by the network service user after receipt of the service request from the network service user, to subsequently retrieve from the memory the stored received service request which has been provided for processing to the selected one of the first and second versions of the network service previously respectively selected for the stored service request, and to provide the retrieved service request to the other of the first version and the second version of the network service for processing.

2. The apparatus of claim 1, wherein the access policy comprises an access policy established by a provider of the network service.

3. The apparatus of claim 1, wherein the first version of the network service is older than the second version of the network service.

4. The apparatus of claim 1, wherein the first version of the network service is newer than the second version of the network service.

5. The apparatus of claim 1, wherein the network service comprises a web service.

6. A communication network element for providing access for a network service user to a network service, the network element comprising:
the apparatus of claim 1.

7. A method comprising:
receiving, from a network service user, a service request associated with access to a network service by the network service user, the service request being destined for a first version of the network service;
determining whether a second version of the network service, which is different from the first version of the network service, is accessible by the network service user, the determining comprising consulting an access policy associated with the network service, the access policy comprising an indication of whether the second version of the network service is accessible by the network service user;
determining whether to select the second version of the network service to process the received service request where the second version of the network service is accessible by the network service user;
selecting one of the first version and the second version of the network service;
determining whether the second version of the network service is capable of processing the received service request where the second version of the network service is selected;
transforming the received service request for processing by the second version of the network service where the second version of the network service is not capable of processing the received service request;
providing the received service request to the selected one of the first version and the second version of the network service for processing;
storing, to a memory, service requests, including the received service request, which have been provided for processing to one of the first version and the second version of the network service that has been previously respectively selected for the stored service requests, the selected one of the first version and the second version of the network service being available for processing the received service request when the received service request is stored to the memory;
determining whether the selected one of the first version and the second version of the network service, to which the received service request has been provided, has become unavailable; and
responsive to a determination that the selected one of the first version and the second version of the network service has become unavailable and independent of further action by the network service user after receipt of the service request from the network service user:
retrieving, from the memory, the stored received service request which has been provided for processing to the selected one of the first version and the second version of the network service; and
providing the retrieved service request to the other of the first version and second version of the network service for processing.

8. The method of claim 7, wherein the access policy comprises an access policy established by a provider of the network service.

9. The method of claim 7, wherein the first version or the second version of the network service is a newer version of the network service.

10. The method of claim 7, wherein the network service comprises a web service.

11. A non-transitory machine-readable medium storing instructions which when executed perform the method of claim 7.

* * * * *